United States Patent [19]
Grothe et al.

[11] Patent Number: 5,319,383
[45] Date of Patent: Jun. 7, 1994

[54] CIRCUIT ARRANGEMENT FOR CONTROLLING THE RASTER-LIKE PICTURED REPRESENTATION OF INFORMATION

[75] Inventors: Josef Grothe, Geseke; Peter Hieronymus, Schloss-Holte, both of Fed. Rep. of Germany

[73] Assignee: Siemens Nixdorf Informationssysteme AG, Paderborn, Fed. Rep. of Germany

[21] Appl. No.: 816,788

[22] Filed: Jan. 3, 1992

Related U.S. Application Data

[63] Continuation of Ser. No. 323,514, Mar. 14, 1989, abandoned.

[30] Foreign Application Priority Data

Mar. 15, 1988 [DE] Fed. Rep. of Germany ....... 3808668

[51] Int. Cl.$^5$ .............................................. G09G 1/06
[52] U.S. Cl. ....................................... 345/128; 382/47
[58] Field of Search ............... 340/731, 732, 733, 735; 382/47, 54; 358/451, 459; 345/128, 129, 130

[56] References Cited

U.S. PATENT DOCUMENTS

| | | | |
|---|---|---|---|
| 4,610,026 | 9/1986 | Tabata et al. | 340/731 |
| 4,680,645 | 7/1987 | Dispoto et al. | 358/459 |
| 4,724,446 | 2/1988 | Hirahara et al. | 358/459 |
| 4,751,507 | 6/1988 | Hama et al. | 340/731 |
| 4,757,311 | 7/1988 | Nakamura et al. | 340/731 |
| 4,821,031 | 4/1989 | Roberts | 340/731 |
| 4,875,173 | 10/1989 | Nakajima | 382/47 |
| 4,916,747 | 4/1990 | Arimoto | 340/731 |

FOREIGN PATENT DOCUMENTS 2025730 1/1980 United Kingdom ............... 358/459
2085257 1/1992 United Kingdom .

Primary Examiner—Ulysses Weldon
Assistant Examiner—M. Fatahiyar
Attorney, Agent, or Firm—Dykema Gossett

[57] ABSTRACT

For the representation of information mon a data display device with picture elements with different side ratios, the speed of readout from the picture information store is changed such that the different kinds of picture elements (A) and (A') are geometrically similar to each other.

3 Claims, 8 Drawing Sheets

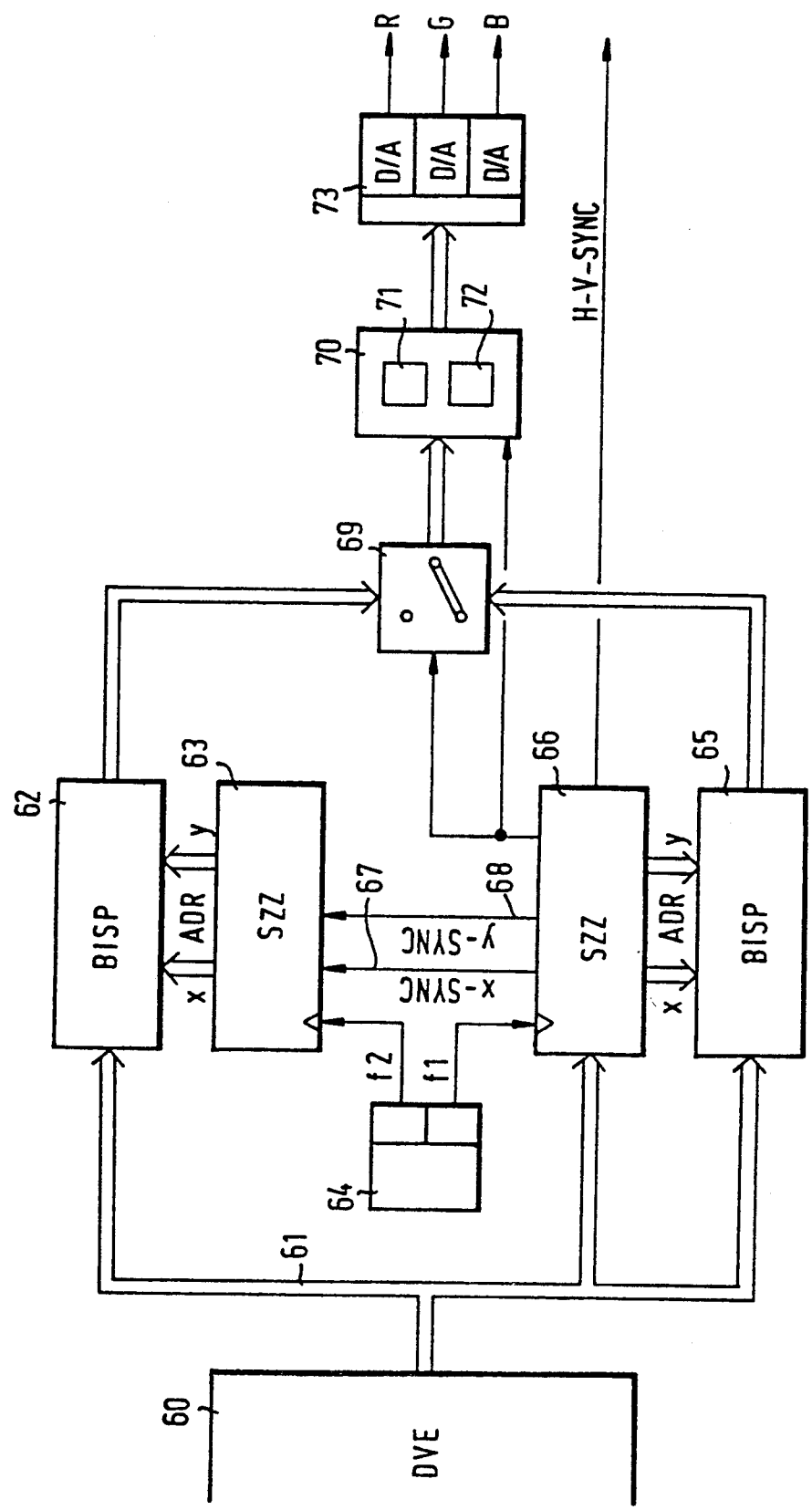

ns5,319,383

CIRCUIT ARRANGEMENT FOR CONTROLLING THE RASTER-LIKE PICTURED REPRESENTATION OF INFORMATION

This is a continuation of copending application(s) Ser. No. 07/323,514 filed on Mar. 14, 1989, now abandoned.

TECHNICAL FIELD

The present invention relates to a system for controlling the raster-like pictured representation of information on a data display device with picture elements, the display area of which has a predetermined side ratio in the x-direction and y-direction by line-by-line readout of picture element information at a predetermined speed of readout from a picture information storage which is addressable picture-element-by-picture-element in the x-direction and y-direction.

BACKGROUND ART

Data display devices have a screen area which possesses a side ratio which is usually 4:3. As the picture element resolution corresponds to this ratio, each picture element information displayed on the screen has a corresponding side length or expansion in x-direction and y-direction. Thus, in the corresponding picture information storage, a true-to-picture pattern of the picture information elements is stored. By the thus obtained square form of the picture elements it is rendered possible to electronically manipulate the stored content in the picture information storage such that on the screen rotary movements of figures, for example, can be displayed without distortion.

Information can also be displayed in the form of pictures with picture elements which differ from the above-described standards of data display devices, as for example, by the video text method. For this method, picture elements are used which have a side ratio of 3:2, i.e. a rectangular form. Then the picture information elements, when displayed on the area of these picture elements, do not have the form of a circular dot but of an ellipse. When, according to the video text method, a square area is displayed, the latter does not consist of the same number of picture information elements in x-direction as in y-direction, but of, for example, 30 picture information elements in the x-direction and 20 in the y-direction.

If such a video text picture is displayed on the screen of a usual data display device, picture distortion occurs which results in the representation of a square as a rectangle with a side ratio which corresponds to the circular picture dots or to the display areas of the picture elements, which have a square form due to the other kind of scanning. This distortion has hardly any influence on the readability of alphanumeric characters when displayed. There is, however, a falsification of the information content in the representation of geometrical figures, as the information will appear more depressed in the y-direction than in the x-direction.

SUMMARY OF THE INVENTION

"An object of the present invention is" to render possible the representation of information with picture elements of different side ratios on a data display device such that there is no falsification.

A system of the kind initially described for achieving this objective is designed such that for the display of information with picture elements the side ratio of which differs from the predetermined side ratio, the speed of readout of the respective picture element information from the picture information storage is changed such that the picture elements generated on the data display device are geometrically similar to the picture elements with differing side ratio.

In accordance with the present invention, information, the display of which is achieved using picture elements with differing side ratios, can also be displayed on a data display device the picture elements of which have the usual side ratio of 1:1. The information is not reproduced true-to-area but geometrically similar, i.e. a square is reproduced as a square and a circle is reproduced as a circle. There is a change in size of such figures but this is of no importance and only become obvious when compared with a screen using the same size but of another type of representation.

The invention can be applied to practically all types of differing side ratios and can be realized with minor additional hardware expense. A change of speed of readout of the picture information store may only be provided for the x-direction or only for the y-direction or for both directions, dependent on which direction the equalization is to be carried out. The speed of readout can be decreased or increased, but in most cases decrease is more suitable, as the resolving power of the data display device has limits which prevent an arbitrary reduction of picture dots. The decrease of the speed of readout for the y-direction can easily be effected by the fact that each line of picture element information from the picture information stored is repeatedly read out in succession. The picture elements and consequently the picture dots are thereby elongated in the y-direction by one or more line thicknesses.

BRIEF DESCRIPTION OF THE DRAWINGS

Advantageous embodiments of the invention, which can be applied to any difference in side ratios of two different types of representation, will now be described with reference to the accompanying drawings in which FIG. 10 is another embodiment of a circuit according to the invention.

DESCRIPTION OF THE PREFERRED EMBODIMENTS

Figure 1A:
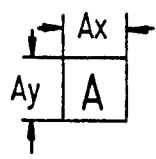
FIGS. 1a and 1b are two picture elements with different side ratios.

FIG. 1a schematically shows a picture element A as it is commonly used in data display devices for the representation of information. The picture element A has a width Az and a height Ay. These two values are conforming so that the picture element A is of a square form, and width and height have a ratio of 1:1. On the square area of representation of the picture element A an information element in form of e.g. a circular picture dot can be displayed.

Figure 1B:
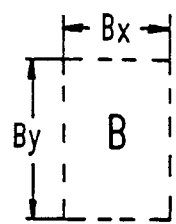

In FIG. 1b, a picture element B, indicated by a dashed line, is shown which has a width Bx and a height By. When the width and height have a ratio of 2:3, the picture element is a picture element B which can be used for the representation of information on a video text display device. Therein the picture element B can be represented on the display area as e.g. an ellipse-shaped picture dot.

Neither of the above-explained picture elements A and B of a data display device and of a video text display device correspond in their size nor in their side ratios.

Figure 2:
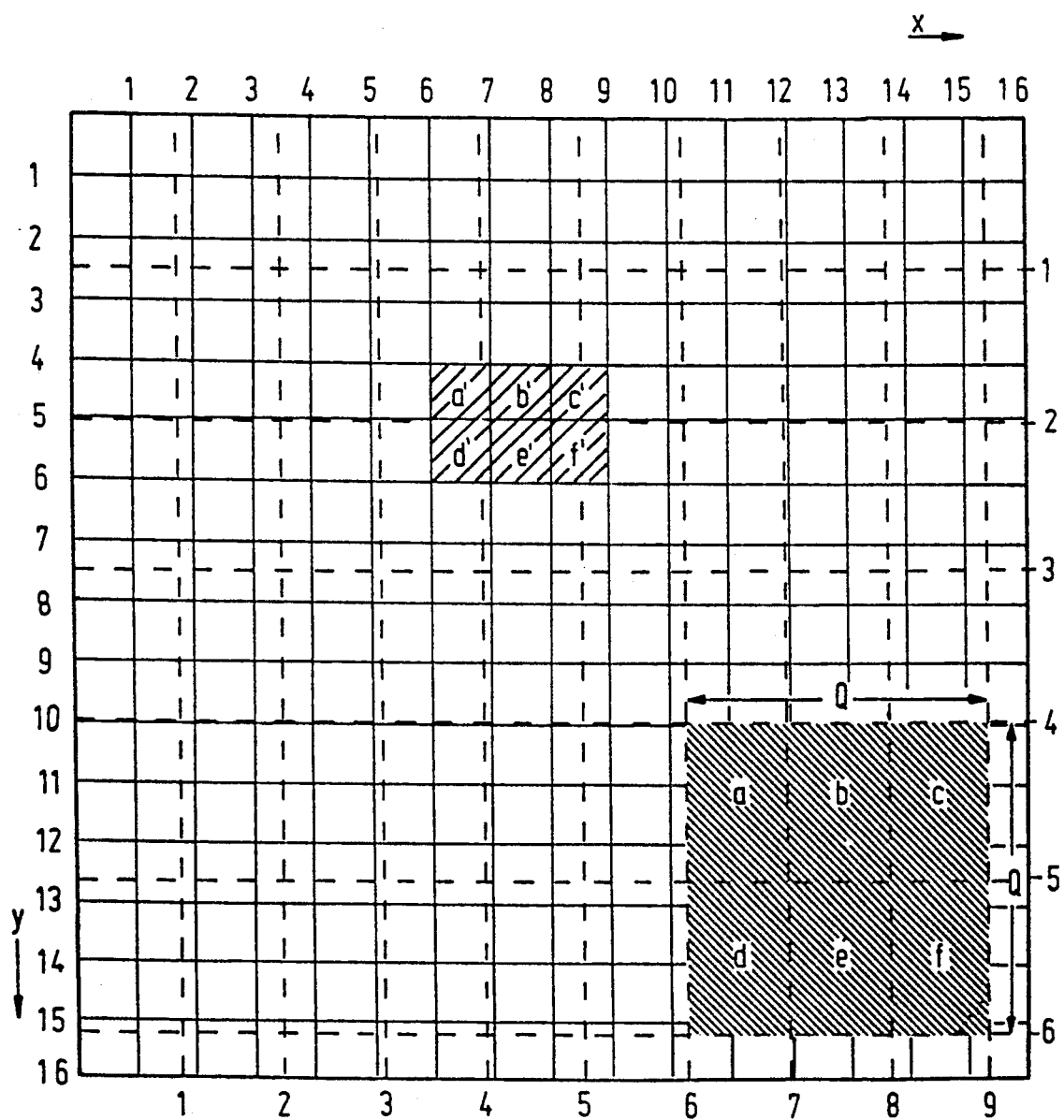
FIG. 2 is a representation of information with picture elements of different side ratios on the same screen.

FIG. 2 shows an enlarged section of the screen of a data display device. This section has 16 columns of square picture elements in the x-direction and 16 lines of picture elements in the y-direction, the square picture elements being of the size of the picture element A as shown in FIG. 1a and indicated by straight lines. This screen section could also accomodate 9 columns and 6 lines of such picture elements which correspond to the picture element B as shown in FIG. 1b. This arrangement of picture elements is indicated in FIG. 2 by dashed lines which are numbered correspondingly.

In FIG. 2, a square with a side length Q is shown in the right-hand bottom part of the screen section, which consists of 6 rectangularly shaped picture elements a to f which each correspond to the picture element B of FIG. 1b. This square would appear on a video text display device as representation of 6 video text picture dots, i.e. as 6 information elements. If these information elements are displayed on a data display device, they would form a rectangle which, in the screen section in FIG. 2, consists of the square picture elements a' to f'. From the different form of the two partial areas having 6 information elements on the screen section it can be seen that for the display of video text information on data display devices a video text object is reduced differently in the x- and y-directions, i.e. it is distorted. Thus, in the representation of video text information on data display devices, for instance squares become rectangles, circles become ellipses, and letters appear depressed in their height. For alphanumeric texts, this distortion in general does not result in a negative effect on the readability. For geometrical figures, however, a change in information is inevitable.

In order to prevent this distortion so that a true-to-area representation of the picture information of the video text on a data display device is achieved, an elongation of the picture elements A of the data display device, as can be seen from FIG. 2, has to be provided in the x-direction and in the y-direction, which corresponds to the sizes of the picture elements A and B (FIG. 1). Furthermore, it can be seen from FIG. 2 that an object of the video text, the top left-hand corner of which has the x,y-address 6, 4, would appear on a data display device dislocated in the top left-hand direction, when it would be represented with the same address but with picture elements of a data display device.

If, in a data display device, the height of the picture elements is to be changed in the y-direction, extensive modifications have to be carried out which lead to a line number different from the standard. An adaptation of the representation of a data display device to the representation on a video text display device with the result that video text information will be reproduced true-to-area on a data display device would cause some difficulties.

Figures 3A, 3B:
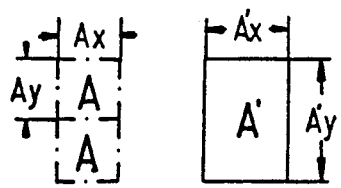
FIGS. 3a and 3b are further picture elements with different side ratios.

In FIG. 3 one kind of modification of the picture element A of a data display device is shown, by which it is rendered possible to represent video text information on a data display device not true-to-area but similar-to-area, i.e. there is a uniform distortion in the x-direction and the y-direction so that only the scale but not the form of the information to be displayed is changed. FIG. 3a shows a picture element which consists of two picture elements A of the type shown in FIG. 1a so that width and height have a ratio of 1:2. FIG. 3b shows a picture element A' which is a result of the widening of the picture element of FIG. 3a and which has the width A'x and the height A'y. The invention has as an object the display of video text information with picture elements of this kind. As the height A'y is double as high as the height Ay of the picture element of FIG. 1a, the picture element A' can be produced on a data display device by representing the respective picture dot twice on top of each other. Consequently, the picture dots of a picture line are to be represented twice one below the other. Then, when each picture dot is widened in x-direction, with the information of each picture dot a picture element is filled which corresponds to the picture element A' of FIG. 3b.

Figure 4:
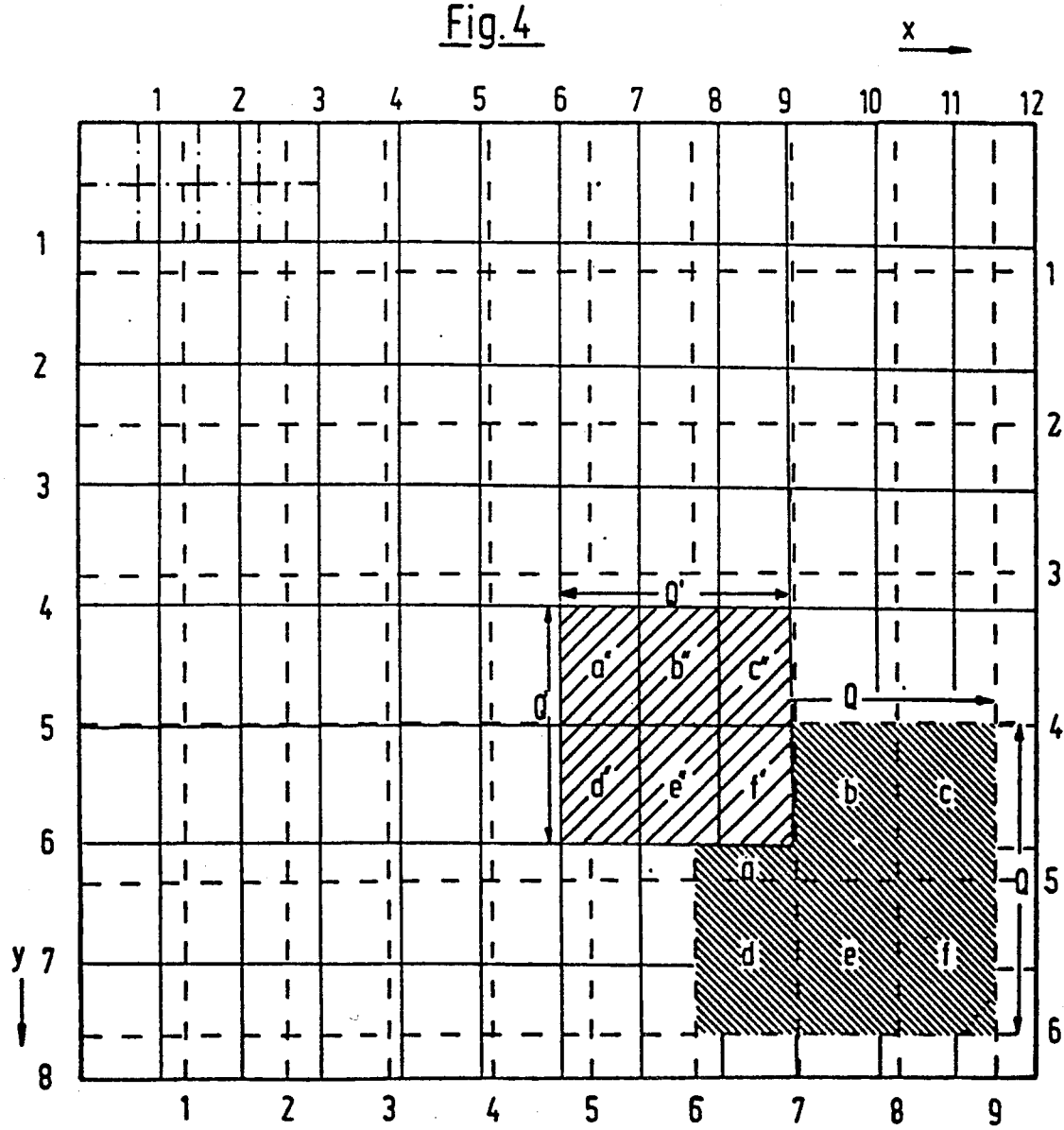
FIG. 4 is a representation similar to FIG. 2 but for the practical use of the invention.

The result of such a display can be seen in FIG. 4. Also shown is a picture section of a data display device, which has the same size as the picture section shown in FIG. 2 and which comprises the square with the side length Q which consists of the picture elements a to f. The top left-hand corner of this square has the x,y-address of 6, 4 in the raster, indicated by dashed lines, of picture elements which correspond to the picture element B of FIG. 1b. FIG. 4 shows another square with the side length Q' the top left-hand corner of which also has the x,y-address 6, 4 in the raster indicated by straight lines and which consists of the picture elements a" to f" which correspond to the picture element A' as shown in FIG. 3b. The square form of the figure reproduced with these picture elements a" to f" is obtained when width and height of the picture element A' of FIG. 3b have a ratio of 2:3, as this is also required for the picture element B of FIG. 1b. It can be readily appreciated that this kind of ratio is obtained when there is A'x=4/3 Zx for A'y=2Ay. In general, for the elongation of a square picture element A in the x-direction, when there is a duplication of the height in the y-direction, in order to form a picture element which is similar to a rectangularly shaped picture element B with the width Bx and the height By the following equation is employed $$v = 2 \cdot \frac{Bx}{By}.$$

In FIG. 4, it is shown that, in putting this principle, to practical use a video text object is reproduced geometrically similar on a data display device, wherein the shifting to the top left-hand direction is less than according to FIG. 2, and a reduction in size takes place which only becomes obvious for corresponding screen sizes but yet can be tolerated.

Figure 5:
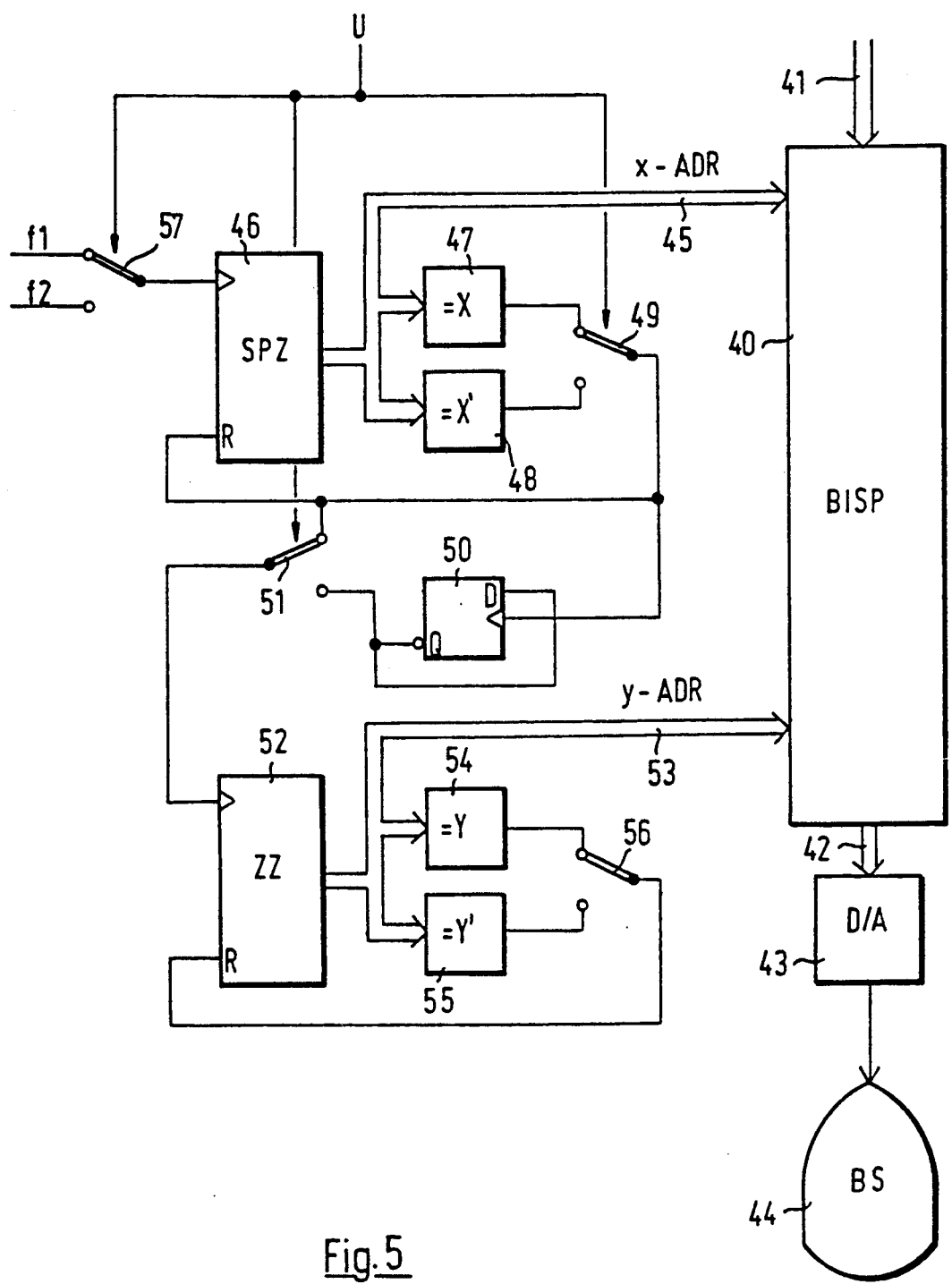
FIG. 5 is an embodiment of a circuit according to the invention.

In FIG. 5, a circuit arrangement is shown by which it is rendered possible to alternatively display normal data information or video text information on a data display device. This circuit arrangement comprises a picture information storage or memory 40 into which picture information of e.g. the working storage of a data processing unit (not shown) can be written via a data bus 41. This picture information which, for example, can indicate the intensity and the color of picture elements are transferred via a data bus 42 form the picture information storage 40 to a converter 43 which transforms the picture information in analog red-green-blue signals for the control of a screen 44. The vertical and horizontal synchronization circuits necessary for the pictured representation of such information are not shown in FIG. 5 It is assumed, however, that the picture repetition frequency and consequently the vertical and horizontal synchronization frequency are constant, independent of the information to be displayed.

For the addressing of the picture information storage 40 a column counter 46 and a line counter 52 are used. The column counter 46 addresses the picture information storage 40 in the x-direction and the corresponding address signals are supplied to the latter via an address bus 45. Via this address bus 45, these address signals are also supplied to the two comparators 47 and 48 which compare the respective relevant address with predetermined values X or X'. The two comparators 47 and 48 generate an output signal, respectively, when the relevant address corresponds to the value X or X'. This output signal is supplied via a change-over switch 49 to the rest input R of the column counter 46, to one side of a change-over switch 51, and to the clock input of a D-flipflop 50. By the connection of the output signal of the comparators 47 and 48 with the reset input R of the column counter 46, the maximum possible number of picture elements per line is determined, in which picture information can be displayed on the screen 44. When this maximum value is reached, column counter 46 starts counting from the value of zero on. This counting is controlled by a frequency f1 which is supplied to the clock input of the column counter 46 via a change-over switch 57. The change-over switch 57 as well as the change-over switches 49 and 51 are controlled via a control signal 4 which is supplied to these change-over switches by the data processing unit (not shown).

The D-flipflop 50 is utilized as a factor 2-divider, since its data input is connected with its negative output Q. The signals supplied to the clock input of the D-flipflop occur at the other side of the change-over switch 51 with half the frequency. The change-over switch 51 is connected with the clock input of the line counter 52 so that the latter is clocked via the output signals of the D-flipflop 50 at the respective position of the change-over switch 51. This means that its counter reading is increased by the value 1 with each or each second resetting of the column counter 46, depending on the position of the change-over switch 51. The output of the line counter 52, as well as the output of the column counter 46, is connected via an address bus 53 with the picture information storage 40 and two comparators 54 and 55. Thereby the picture information storage 40 is addressed in the y-direction, wherein the line counter 52 is reset each time when comparator 54 signals the reaching of the line value Y or comparator 55 signals the reaching of the line value Y', and this signal is supplied to the reset input of line counter 52 via a change-over switch 56. The change-over switch 56 is also controlled via the control signal U from the data processing unit (not shown).

In the position of the change-over switches 49, 51, 56, and 57, as shown in FIG. 5, the content of the picture information storage 40 is represented on the screen 44 by picture elements the raster of which corresponds to the one of a normal data display device. Therein, the speed of readout in the x-direction is determined by the frequency f1 and is switched over to the next line with each resetting of the column counter 46. The last column or line is determined by the comparators 47 and 54 which signalize the counter reading X or Y.

When the picture information storage 40 contains picture information which is to be represented in picture elements which differ from the size of the picture elements of a common data display device, the change-over switches 49, 51, 56, and 57 must be put in their second position by using the control signal U. In this position, the speed of readout is determined by the frequency f2 which forms the ratio of 3:4 with frequency f1. This results in a slower readout of the picture information and consequently in the their elongation in x-direction with a factor 4/3 in contrast to the previous representation. The speed of readout in the y-direction is reduced by the factor 2 by means of the D-flipflop 50. As a constant value of the horizontal and vertical synchronization of the screen 44 is taken for granted, the picture information of one line is reproduced anew in the next line by means of the change-over. The two comparators 48 and 55 determine the resetting of the column counter 46 and of the line counter 52 each time the counter reading X' and Y' is reached. The necessary magnitude of these values will be described in the following with reference to FIG. 6.

Figure 6A:
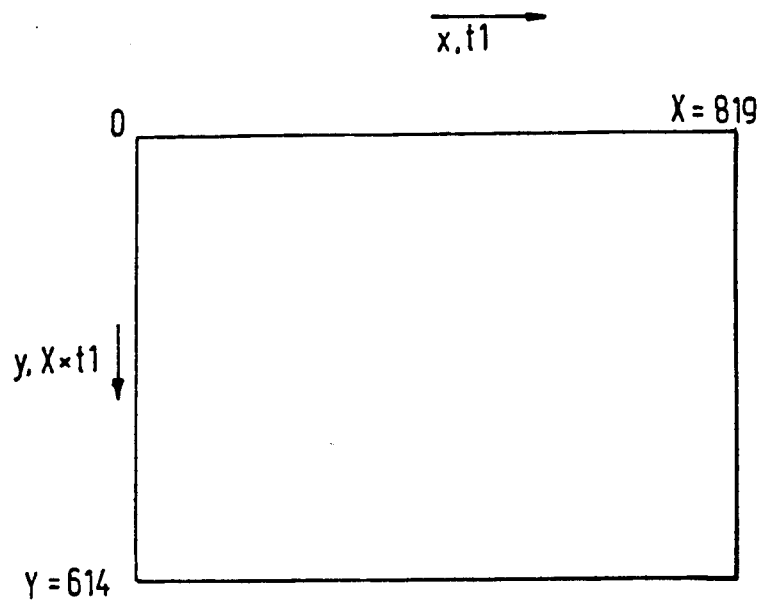
FIGS. 6a and 6b are schematic representations of the addressing principle of a picture information storage when using the invention in a video text display with a data display device.

In FIG. 6a, the counting volumes of the column counter 46 (FIG. 5) and of the line counter 52 (FIG. 5) are shown as a diagram for the case of the representation of information on the screen 44 with square picture elements the number of which is 820 per line and the line number is 615. Thus, inclusive of the counter reading zero the column counter 46 is reset when reaching the counter reading X=819 and the line counter 52 when reaching the counter reading Y=164. The diagram shown in FIG. 6a, consequently, does not only indicate the counting volumes in the x-direction and the y-direction but also multiples of the clock time t1=1/f1 in the x-direction and multiples of the clock time X·t1 of the line counter 52 in the y-direction. Furthermore, it is also possible to interpret the diagram of FIG. 6a as a reproduction of the area of the screen 44.

Figure 6B:
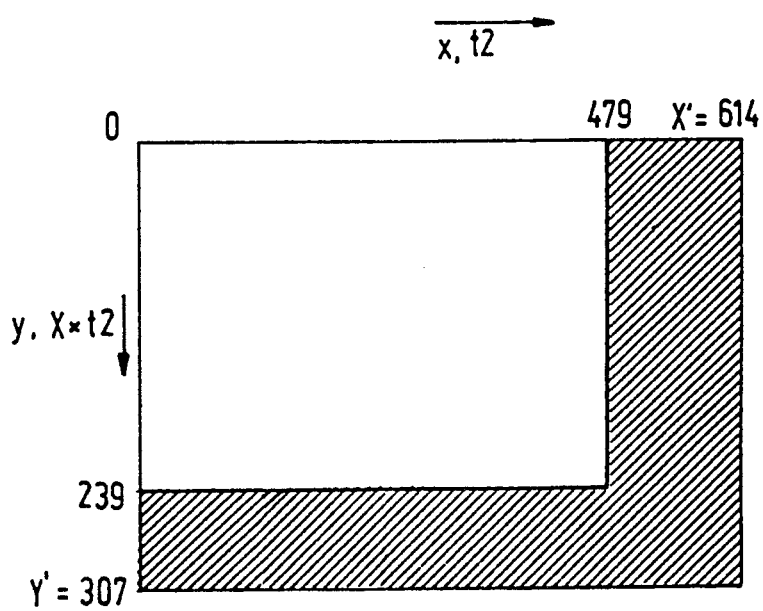

When, for the representation of information on the screen, rectangular picture elements are to be used instead of square ones, and these rectangular picture elements correspond to the picture element A' as shown in FIG. 3b, and when, furthermore, this information representation consists of video text information, the diagram of FIG. 6b is obtained which indicates the counting volume 615 for the column counter 46 and the counting volume 308 for the line counter 52. In the x-direction this corresponds to a clock time t2=1/f2 and in the y-direction to a clock time X'·t2. Then, inclusive of the counting value zero, the column counter 46 and the line counter 52 only reach the counting value X'=614 and Y'=307, respectively. The counting volumes 615 and 308 are obtained by the fact that the picture elements of monitor 44 are widened by the factor 4/3 in the x-direction and their height is to be duplicated in the y-direction according to the requirements. Then the screen 44 can only accomodate 615 picture elements in the x-direction and 308 in the y-direction. As, however, the representation of video text information according to standards is carried out with 480 picture dots in the x-direction and 240 lines in the y-direction, the screen 44 of the data display device cannot be totally used for the representation of a video text picture. The unused area is indicated by hatches in FIG. 6b. As a constant line synchronization control is also required for the display of video text information on screen 44, additional 135 counting steps have to be carried out after 480 counted picture information addresses during scanning in the x-direction. Similar measures have also to be taken in the y-direction for a constant picture repetition rate, wherein the line counter 52 has to take not only 240 counting steps but also 68 additional ones.

The diagram of FIG. 6b also corresponds to the actual picture display of the video text object when the scanning beam of screen 44 for the x,y-address 0, 0 of the video text picture also has the position 0, 0 in screen 44. Otherwise the hatched section can also appear at another position, i.e. the white display area shown in FIG. 6b then has another location. The picture information storage 40 should also contain predetermined information for the hatched section, e.g. a constant color reproduction, as the readout of information during the addressing of the picture information store 40 basically is not interrupted.

In the foregoing it was assumed that by the circuit arrangement shown in FIG. 5 either a representation of information with picture elements A of the kind shown in FIG. 1a or with picture elements A' of the kind shown in FIG. 3b is to be controlled. This can be achieved without any problems by the circuit arrangement of FIG. 5, if the filling of the whole screen either with tone or the other kind of information is concerned. But when a picture-in-picture representation with picture elements of different dimension in the x- and y-directions is to be carried out, as it is shown in FIG. 4 for the square with the side length Q' in an enlarged screen section, by using the circuit arrangement of FIG. 5, effects can occur which can only be avoided by increased circuitry expense. For purposes of explanation reference is now made to FIG. 7 in which a diagram of the chronological order of the addressing of the column counter 46 in the x-direction is shown. The course 20 shows the increase in the counter reading of the column counter 46 starting from zero up to the final value X which is reached at the point of time Ts. The course 21 indicated by dashed lines respectively show the counter reading of the column counter 46 starting from zero up to the final value X' which is also reached at the point of time Ts. The slopes of the two courses 20 and 21 correspond to the clocking of the column counter 46 with the frequency f1 or f2. Subsequent to the point of time Ts the counting for the column counter 46 starts again from the counter reading zero. When one part of the screen surface is to display information with picture elements which are broader than the picture elements used in the other part of the screen surface, the counting has to be delayed during the time which corresponds to the width of the different picture section. For this time tx, a course 22 is indicated by dot-dash lines in FIG. 7, by which it becomes obvious that the column counter 46 is clocked more slowly during the time tx and after the time tx reaches a lower counter reading then for a normal course 20. Starting from this lower counting reading, the column counter 46 is then clocked at a higher speed again. The counter reading of the column counter 46, however, according to the course 23 which is a continuation of the line of course 22, can only reach the final reading Xe at the point of time Ts. When the counting is continued, the column counter 46 reaches the final reading X, which corresponds to its counting volume, but only at a later point of time Te for which the scanning beam of the screen can already be located in the next line. The difference X-Xe is obtained, which has to be individually determined for the respective size of a picture section to be represented within a larger picture from the ratio tx:Ts in order to carry out a respective correction when the picture information storage 40 (FIG. 5) is addressed. It is not so simple to obtain a correction of the shifting in the x-direction to which a picture dot P which, according to the course 20, would normally be represented at a certain location of the screen, is subjected due to the changed course 23. Thereby, the picture dot P is displayed as incorrect picture dot P' at a alter point of time, i.e. shifted in the x-direction. Information with a column address which has a value greater than Xe can no longer be displayed.

Problems similar to the kind described above also occur with regard to the addressing of the picture information store 40 in the y-direction.

Figure 7:
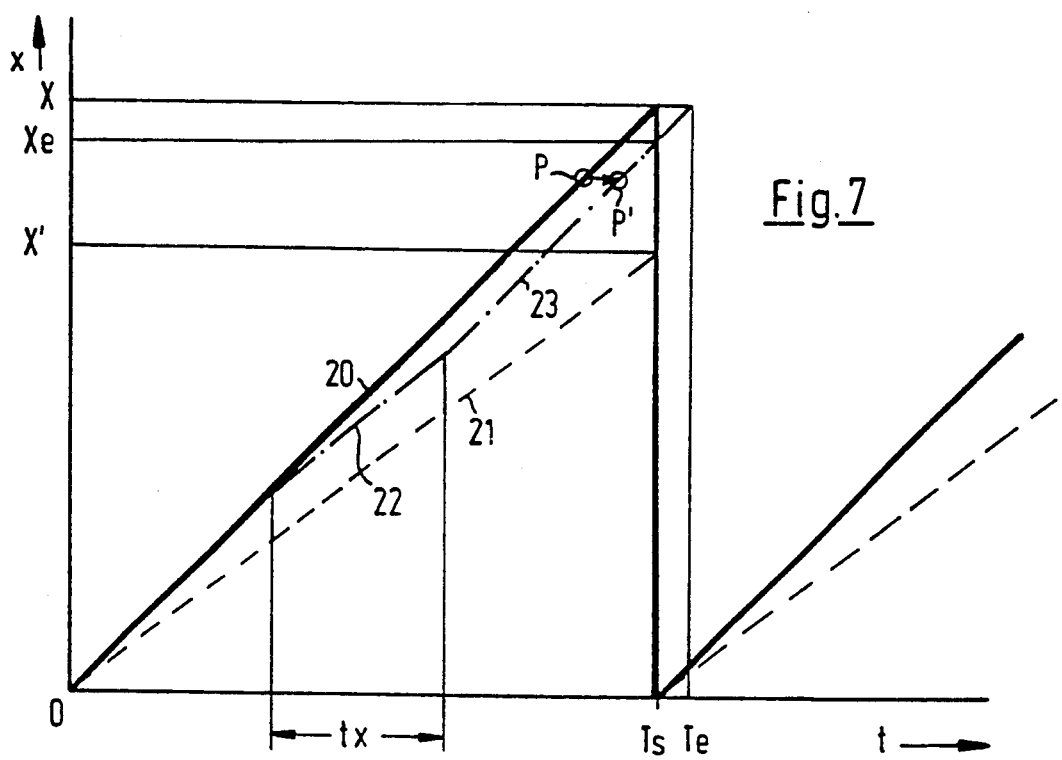
FIG. 7 shows the addressing in the circuit according to FIG. 5 for the case of a picture-in-picture representation.

Extensive additional circuits for respective corrections become unnecessary when two separate picture information storages for picture elements A on the one hand and for picture elements A' on the other hand are used. When the one picture information storage can be addressed according to the course 20 as shown in FIG. 7 and the other picture information storage according to the course 21 as shown in FIG. 7 in the x-direction and the y-direction, respectively. The addressing of both picture information storage must have the same picture repetition frequency so that a fixed picture-in-picture representation is obtained when using two picture information storage with separate column and line addressing. This is easily obtained by the fact that the clock frequencies of both column counters are derived from the same source and the final values of the column counters comply with the requirements described with respect to FIG. 6. It is also useful to synchronize the column counter and the line counter of the one picture information storage with the column counter and line counter of the other picture information storage in order to connect the zero points of all counters fixedly with regard to time. Otherwise the counters would always each reach the same counter reading in a corresponding time but the absolute counter reading reached at the respective point of time would be determined by undetermined states in the moment when the circuit arrangement is switched on.

Figure 8:
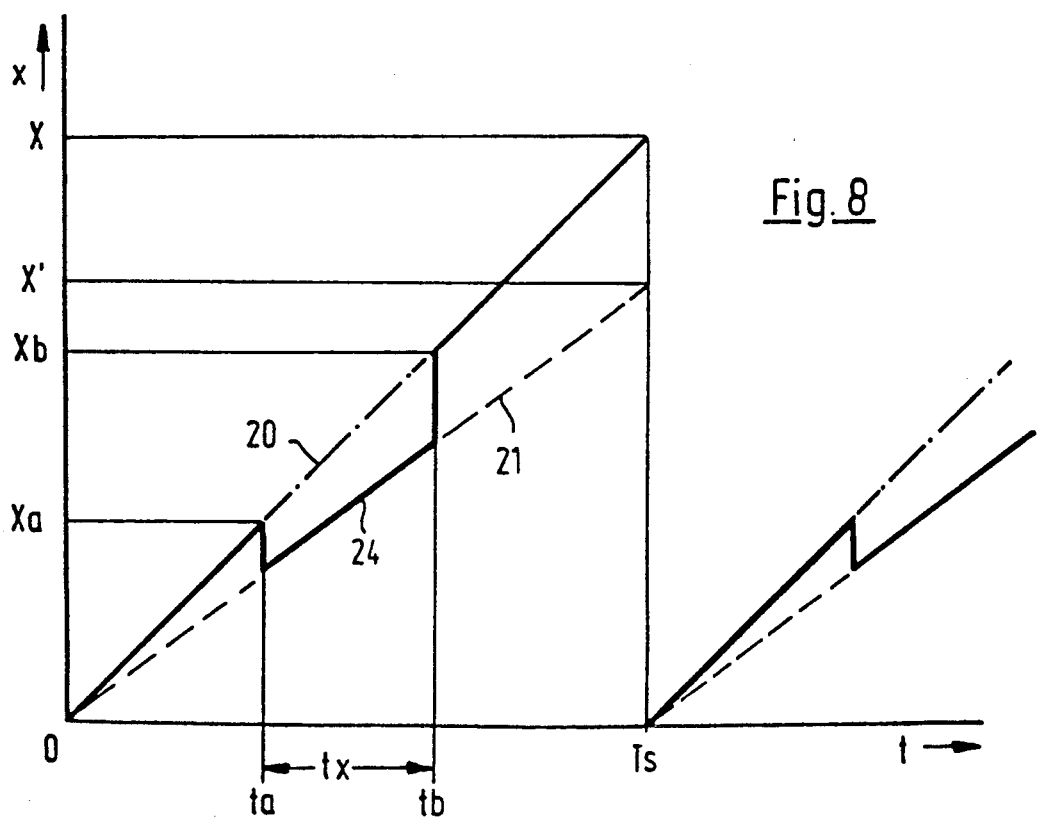
FIG. 8 shows an addressing procedure similar to FIG. 7 but for use in an embodiment of the invention, FIGS. 9a and 9b each is a schematic picture-in-picture representation of a practical use of the invention.

In FIG. 8 the course of the addressing of two picture information storages in the x-direction is shown, which is a combination of the individual courses 20 and 21 as already indicated in FIG. 7 so that during the time tx a jump from the course 20 to the course 21 is obtained, which corresponds to the section 24 of the combined curve. At the beginning of time tx there is a changeover to this section 24 and thus from one picture information storage to the other, and at the end of time tx there is a change back to the first picture information storage.

A similar characteristic is also obtained for the addressing of two picture information storages in the y-direction.

The switching over from one picture information storage to another is carried out according to the representation of FIG. 8 at the points of time ta and tb. As a criterion for the switch-over, the counter reading of one of the two column or line counters can be used, as these counters continue counting independent of the change-over. Correspondingly, e.g. for the column counter with the counting characteristic 20, there is a counter reading Xa or Xb, respectively, at the beginning and at the end of the period tx. In the same manner two counter readings for the line counters can be obtained, which define a period tx which corresponds to the extension in y-direction of the picture section to be represented.

Figure 9A:
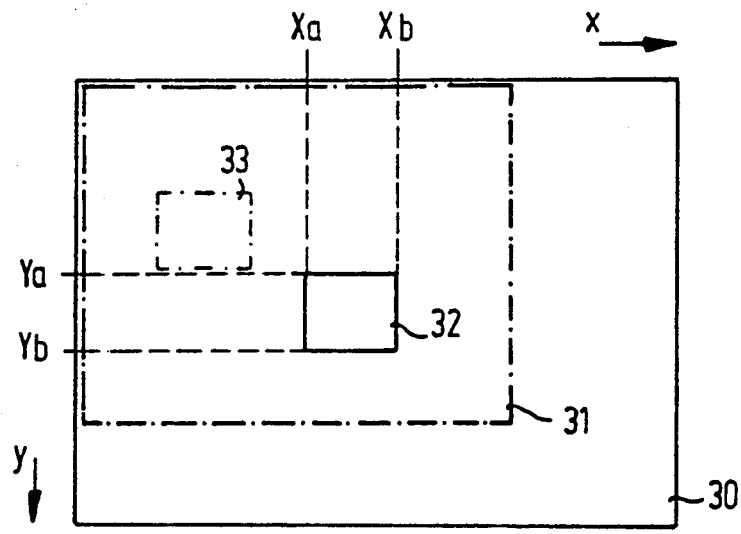

By the switching over in the x- and y-directions, in the representation on the screen of a data display device a time window or an area is opened on which a further picture can be represented with picture elements A' (FIG. 3b) within a picture with picture elements A (FIG. 1a). Such kind of representation is shown in FIG. 9a, corresponds to the representation of FIG. 6b, i.e. on the display are 30 of a data display device a total picture could be represented which, e.g. is a video text picture. A section 32 of this video text picture is only represented within the limits determined by the described counter readings Xa, Xb, Ya, and Yb.

Figure 9B:
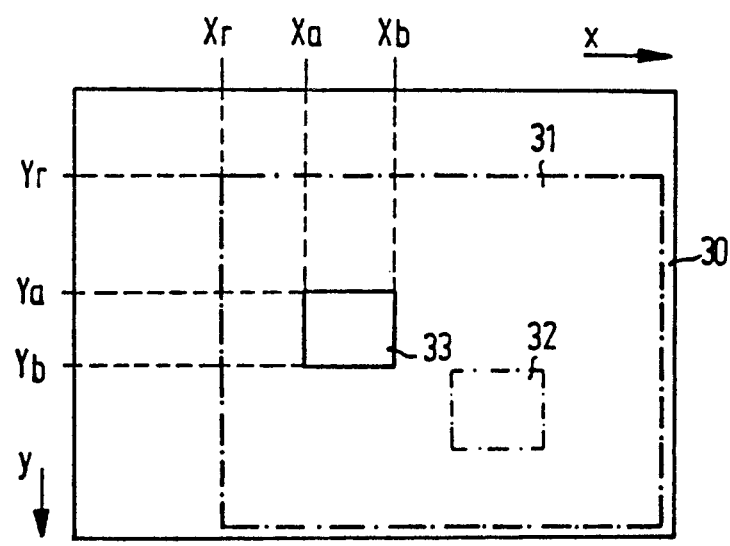

In FIG. 9a a further section 33 of the video text picture is indicated by dot-dash lines. When this partial picture 33 is to be displayed at the location of the display area 30, at which also the partial picture 32 will be displayed, this can be obtained by a shifting of the whole video text picture 31, as it is shown in FIG. 9b. This shifting results from displacement of the zero points of these counters which address the picture information storage containing the video text picture. When the corresponding column counter is reset with a delay of Xr, the respective first picture dot of a line is read out from the picture information storage with the corresponding delay. At this point of time, however, the scanning beam is at a position which corresponds to the address Sr of FIG. 9b. A corresponding shifting can be provided in the y-direction by the amount of Yr.

In FIG. 10, a circuit arrangement is shown by which the function of FIG. 8 and 9 is enabled and which operates with two picture information storages. Via an address data bus 61, a data processing unit 60 supplies to a first picture information storage 62 picture information which is to be displayed with picture elements A' (FIG. 3b). The picture information store 62 is addressed by a column-line counter 63 in the x- and y-directions. The clock input of the column-line counter 63 is controlled via a clock generator 64 which supplies the clock frequency f2.

A further picture information storage 65, which is also supplied with picture information via the address data bus 61, is provided for the display of this picture information with picture elements A (FIG. 1a). The picture information storage 65 is addressed by a column-line counter 66 in the x- and y-directions, which is clocked by the clock signals of the frequency f1 which is also supplied by the clock generator 64. Similar to the circuit arrangement of FIG. 5, the frequencies f1 and f2 have the ratio 4:3. Suitable frequency values are e.g. f1=50 MHz and f2=37,5 MHz.

The column-line counter 66 synchronizes the column-line counter 63 via two outputs 67 and 68 in the x- and y-directions.

The output signals of the two picture information storages 62 and 65 are supplied via a change-over switch 69 to a color table storage 70 which contains a transformation table 71 or 72, respectively, for the picture information from the picture information storage 62 or 65. Thereby the picture information is transformed in digital values for the individual colors red, green, and blue. These values are subsequently supplied to a digital/analog converter circuit 73 which converts the digital values for each color into the respective analog values. These signals are then supplied to the display screen. Furthermore, it is also supplied with a horizontal-vertical synchronization signal which is generated by the column-line counter 66.

The column-line counter 66 also controls the change-over switch 69 and the color table storage 70. The change-over has the advantage that for both color tables 71 and 72 a common storage device and a common digital/analog converter circuit can be used.

The setting of a picture-in-picture-window according to the principle of FIG. 8 is carried out in the column-line counter 66 with values supplied thereto via the address bus 61.

Figure 11:
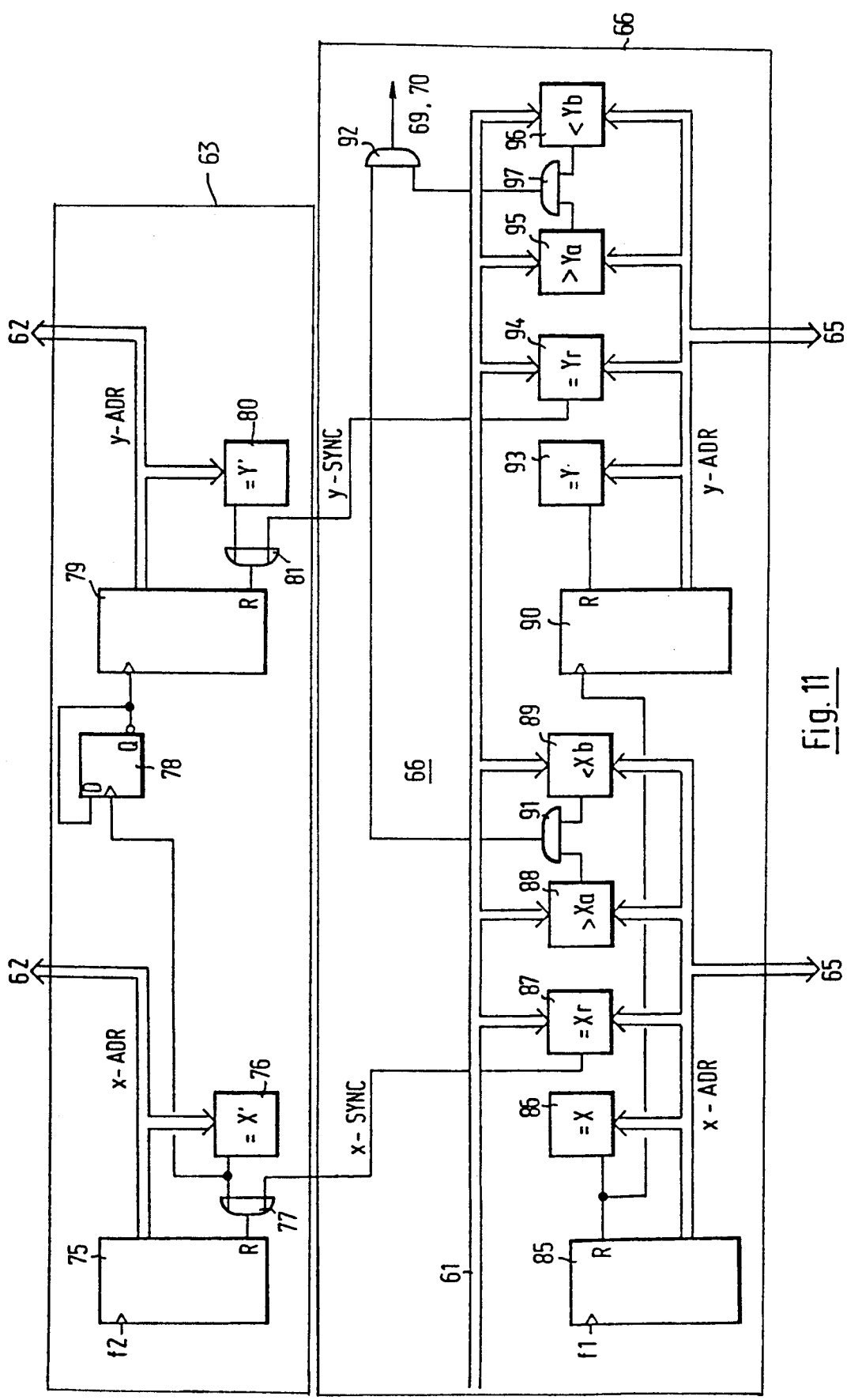
FIG. 11 is a representation of address circuits used in the circuit arrangement of FIG. 10.

FIG. 11 shows an embodiment of the column-line counters 63 and 66 as given in FIG. 10. In the top part of the figure, the column-line counter 63 is represented and in the bottom part the column-line counter 66. The column-line counter 63 comprises a first column counter 75 the clock input of which is controlled by the clock signals of the frequency f2. The output signals of the first column counter 75 are supplied to a comparator 76 as well as to the picture information storage 62. When the output signals correspond to the predetermined counter reading X', the comparator 76 supplies a reset signal via an OR element 77 to the rest input of the column counter 75. The OR element 77 is also triggered by the x-synchronization signal from the column-line counter 66.

The output of the comparator 76 is connected with a D-flip-flop 78 which functions as a factor 2-divider. The latter's negative output Q is connected with the clock input of a first line counter 79. The latter, as well as the column-line counter 75, is connected with a comparator 80 which, when a predetermined counter reading Y' is reached, supplies an output signal via an OR element 81 to the reset input of the line counter 79. The output signals of the line counter 79 are also supplied to the picture information storage 62. The OR element 81 is triggered at its second input by the y-synchronization signal from the column-line counter 66.

The column-line counter 66 comprises a second column counter 85 to the clock input of which the clock signals with the frequency f1 are supplied. The output of the column counter 85 is connected with the picture information 65 and with the first inputs of the comparators 86, 87, 88, 89. The comparators 87, 88, 89 are connected at their second inputs with the address data bus 61 and via the latter are supplied with the values Xr, Xa, and Xb (FIGS. 8, 9). The comparison value X of the comparator 86 is fixedly set. The output of the comparator 86 is connected with the reset input of the column counter 85 and the clock input of a second line counter 90. The output of comparator 87 supplies the x-synchronization signal. The outputs of the comparators 88 and 89 are connected with the two inputs of an AND element 91 the output of which triggeres the input of another AND element 92.

The output of the line counter 90 is connected with the inputs of comparators 93, 94, 95, 96. These comparators are switched similarly to the comparators 86, 87, 88, 89 and are used for the derivation of the respective y-signals and of the second input signal for the AND element 92 via an AND element 97. The comparators 94, 95, 96 are also supplied via the address data bus 61 with their second input signals. The output of the line counter 90 supplies its signals for the y-direction to the picture information storage 65. The AND element 92 supplies the control signal for the change-over switch 69 and the color table storage 70.

The function of the column-line counter 63 becomes obvious by the description of the functions of the circuit arrangement as shown in FIG. 5. The same applies to the functioning of the column-line counter 66 as far as the column counter 85 with the comparator 86 and the line counter 90 with the comparator 93 are concerned. The relationship of the two column-line counters 63 and 66 corresponds to the function as described with the help of FIG. 8 and 9. When the column counter 85 reaches the counter reading X, it is reset. When the counter reading Xr is reached, the x-synchronization signal is supplied to the column-line counter 63 and the column counter 75 of the latter is reset. When the counter reading lies between the values Xa and Xb, the comparators 88 and 89 supply a logic 1-signal and the AND element 91 is interconnected. The output signal of the AND element 91 then determines the switching time of the change-over switch 69 in the x-direction. Analog functioning is also obtained for the y-direction by the line counter 90 and the comparators 93, 94, 95, 96. Due to this function, the change-over switch 69 is only operated when the x-address and the y-address lie within the areas determined by the values Xa, Xb, and Ya, Yb.

What is claimed is:

1. An apparatus for forming picture elements on a display device comprising:
   first storage means, coupled to said display device, for receiving first picture information at a first speed and for ordering and for storing said first picture information in a certain number of rows and columns;
   second storage means, coupled to said display device, for receiving second picture information at a second speed and for ordering and for storing said second picture information in a certain number of rows and columns;
   first counter means, coupled to said first storage means, for selectively transferring at least one row of said firs stored picture information at a certain third speed to said display device, said third speed being faster than said first speed, and for selectively transferring at least one column of said first picture information at a certain fourth speed to said display device, said fourth speed being faster than said first speed, thereby forming first picture elements of a firs size upon said display device;
   second counter means, coupled to said second storage means, for selectively transferring at least one row of said second stored picture information to said display device and for selectively transferring at least one column of said second stored picture information to said display device thereby, forming second picture elements of a second size upon said display device.

2. A circuit arrangement for controlling the raster-like pictured representation of information on a data display device by means of picture elements, the display area of said data display having a predetermined side-ratio in the x-direction and in the y-direction determined by line-by-line readout of picture element information at a predetermined speed of readout from a picture information store, said data display being addressable picture-element-by-picture-element in said x-direction and in said y-direction, comprising:
   a resetable column counter having a counting frequency switchable between a first (f1) clock frequency and a second (f2) clock frequency to alter said readout speed, such that said first clock frequency (f1) results in a first final x and y readout position (X, Y) and said second clock frequency (f2) results in a second final x and y readout position (X', Y');
   a line counter responsive to said column counter and incremented upon the resetting of said column counter, said column counter and said line counter cooperating to address said picture information store in said x- and y-directions; and
   a frequency divider coupled with said line counter for dividing said clock frequencies such that said line counter is incremented upon selected resettings of said column counter,
   whereby said readout speed from said picture information store of said picture element information having a side ratio which differs from said predetermined said ratio is changed.

3. A circuit having a picture information store for controlling the raster-like pictured representation of information on a data display device by means of picture elements, the display area of said display device having a predetermined side-ratio in an x-direction and in a y-direction determined by line-by-line readout of picture element information at a predetermined readout speed from said picture information store, which is addressable picture-element-by-picture-element in said x-direction and in said y-direction, wherein, for the display of information with picture elements whose side ratio differs from the predetermined side ratio, the readout speed of the respective picture element information from said picture information store is changed such that the picture elements generated on said data display device are geometrically similar to said picture elements having a differing side ratio, comprising:
   a resetable column counter having a counter frequency;
   a resetable line counter connected with said column counter by a clock control connection; and,
   a frequency divider,
   said column counter, said line counter and said frequency divider being operatively connected with each other and said information store and operative such that the addressing of the picture information store is carried out in the x-direction by said column counter and in the y-direction by said line counter clocked by said column counter upon each resetting thereof, wherein each of the line and column counter are switchable between first and second final values which correspond to their values upon resetting, when the readout speed is changed in the x-direction by switching the counter frequency of said column counter, and wherein concurrently with the switching of the counter frequency of the column counter said frequency divider is switched into a clock control connection between said column counter and said line counter.

* * * * *